(12) United States Patent
Matsumoto (10) Patent No.: US 10,366,295 B2
(45) Date of Patent: Jul. 30, 2019

(54) OBJECT RECOGNITION APPARATUS

(71) Applicant: DENSO CORPORATION, Kariya, Aichi-pref. (JP)

(72) Inventor: Yusuke Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 165 days.

(21) Appl. No.: 15/504,192

(22) PCT Filed: Aug. 3, 2015

(86) PCT No.: PCT/JP2015/071979
§ 371 (c)(1),
(2) Date: Feb. 15, 2017

(87) PCT Pub. No.: WO2016/027652
PCT Pub. Date: Feb. 25, 2016

(65) Prior Publication Data
US 2017/0262716 A1 Sep. 14, 2017

(30) Foreign Application Priority Data
Aug. 18, 2014 (JP) .................... 2014-165948

(51) Int. Cl.
*G06K 9/00* (2006.01)
*G08G 1/16* (2006.01)
(Continued)

(52) U.S. Cl.
CPC .......... *G06K 9/00805* (2013.01); *B60R 11/04* (2013.01); *G01S 13/867* (2013.01);
(Continued)

(58) Field of Classification Search
CPC .......... G06K 9/00805; G06K 9/00798; G08G 1/166; G08G 1/163; G08G 1/165;
(Continued)

(56) References Cited

U.S. PATENT DOCUMENTS 8,761,991 B1 * 6/2014 Ferguson ............. G05D 1/0088
340/917
2007/0046449 A1 3/2007 Koike et al.
(Continued)

FOREIGN PATENT DOCUMENTS

JP 4823781 B2 11/2011

*Primary Examiner* — Joseph Suh
(74) *Attorney, Agent, or Firm* — Knobbe Martens, Olson & Bear, LLP (57) ABSTRACT

An object recognition apparatus learns an axis displacement amount of a reference axis of first object detecting means, combines and integrates, as information belonging to a same object, a plurality of pieces of information present within a first combining area and a second combining area, when a positional relationship between the first combining area and the second combining area meets a predetermined combinable condition. The first combining area is set as an area in which pieces of information related to the object acquired by the first object detecting means are combined. The second combining area is set as an area in which pieces of information related to the object acquired by second object detecting means are combined. The object recognition apparatus variably sets sizes of the first combining area and the second combining area based on a learning state of the axis displacement amount of the reference axis.

14 Claims, 4 Drawing Sheets

(51) Int. Cl.
*B60R 11/04* (2006.01)
*G01S 13/86* (2006.01)
*G01S 13/93* (2006.01)
*G06T 7/73* (2017.01)
*G01S 17/93* (2006.01)

(52) U.S. Cl.
CPC ........ *G01S 13/931* (2013.01); *G06K 9/00798* (2013.01); *G06T 7/73* (2017.01); *G08G 1/16* (2013.01); *G08G 1/163* (2013.01); *G08G 1/165* (2013.01); *G08G 1/166* (2013.01); *B60R 2300/107* (2013.01); *B60R 2300/301* (2013.01); *B60R 2300/804* (2013.01); *B60R 2300/8033* (2013.01); *B60R 2300/8093* (2013.01); *G01S 17/936* (2013.01); *G01S 2013/9367* (2013.01); *G06T 2207/10024* (2013.01); *G06T 2207/10028* (2013.01); *G06T 2207/30261* (2013.01)

(58) Field of Classification Search
CPC ................ G08G 1/16; B60R 2300/804; B60R 2300/107; B60R 2300/301; B60R 2300/8033; B60R 2300/8093; B60R 11/04; G06T 2207/10024; G06T 7/73; G06T 2207/30261; G06T 2207/10028; G01S 2013/9367; G01S 13/867; G01S 13/931; G01S 17/936
See application file for complete search history.

(56) References Cited

U.S. PATENT DOCUMENTS

| | | | |
|---|---|---|---|
| 2012/0236125 A1* | 9/2012 | Umezawa | G01C 3/085 348/47 |
| 2014/0300693 A1* | 10/2014 | Hirata | H04N 5/23216 348/39 |
| 2016/0027176 A1* | 1/2016 | Zeng | G06T 7/80 348/148 |
| 2016/0096466 A1* | 4/2016 | Okumura | B60Q 1/24 315/82 |
| 2016/0314365 A1* | 10/2016 | Poledna | G06K 9/00805 |
| 2016/0349356 A1 | 12/2016 | Takaki | |
| 2017/0177958 A1* | 6/2017 | Yamanoi | G01C 21/30 |

* cited by examiner

OBJECT RECOGNITION APPARATUS

CROSS-REFERENCE TO RELATED APPLICATION

This application is a U.S. National Phase Application under 35 U.S.C. 371 of International Application No. PCT/JP2015/071979 filed on Aug. 3, 2015 and published in Japanese as WO 2016/027652 A1 on Feb. 25, 2016. This application is based on and claims the benefit of priority from Japanese Patent Application No. 2014-165948, filed Aug. 18, 2014. The entire disclosures of all of the above applications are incorporated herein by reference.

TECHNICAL FIELD

The present invention relates to an object recognition apparatus. In particular, the present invention relates to an object recognition apparatus that is mounted to a moving body.

BACKGROUND ART

Conventionally, mounting a plurality of object detection sensors, such as millimeter wave radars and laser radars, and imaging apparatuses, such as imaging cameras, in a vehicle, detecting an object, such as a leading vehicle, a pedestrian, or an obstacle, present in the vehicle periphery, and performing various types of control to improve running safety of the vehicle based on object detection results has been proposed (refer to, for example, PTL1). PTL1 discloses determining whether or not likelihood of collision with a vehicle is present based on a determination result regarding whether or not an object detected in an object detection area of a camera and an object detected in an object detection area of a millimeter wave radar are the same.

CITATION LIST

Patent Literature

[PTL 1] Japanese Patent Publication No. 4823781

SUMMARY OF INVENTION

Technical Problem

In cases in which an object that is present in a vehicle periphery is recognized based on a plurality of detection results acquired by a plurality of object detection apparatuses, should axis displacement occur in a reference axis of any of the object detection apparatuses, the objects detected by the plurality of object detection apparatuses may be recognized as being different objects, regardless of the objects actually being the same object. In such cases, controllability of the various types of control for improving running safety of the vehicle may decrease.

The present invention has been achieved in light of the above-described issues. An object of the present invention is to provide an object recognition apparatus that is capable of accurately performing object recognition in a system that recognizes an object based on detection results from a plurality of object detecting means.

Solution to Problem

To solve the above-described problems, the present invention uses the means below.

The present invention relates to an object recognition apparatus that is mounted to a moving body. The moving body is provided with a plurality of object detecting means for detecting an object present within a predetermined detectable area including a reference axis. The plurality of object detecting means include a first object detecting means and a second object detecting means. The detectable area of the first object detecting means and the detectable area of the second object detecting means overlap each other.

The object recognition apparatus includes: an axis displacement learning means for learning an axis displacement amount of the reference axis of the first object detecting means; an integration processing means for combining and integrating, as information belonging to a same object, a plurality of pieces of information present within a first combining area and a second combining area, when a positional relationship between the first combining area and the second combining area meets a predetermined combinable condition, the first combining area being set as an area in which pieces of information related to the object acquired by the first object detecting means are combined, the second combining area being set as an area in which pieces of information related to the object acquired by the second object detecting means are combined; and a combining area setting means for variably setting sizes of the first combining area and the second combining area based on a learning state of the axis displacement amount learned by the axis displacement learning means.

When axis displacement occurs in the reference axis of the first object detecting means, a target extracted based on a detection result from the first object detecting means may be recognized as being present in a position that differs from an actual position. In this case, when the process for combining and integrating the pieces of object information acquired from the first object detecting means and the second object detecting means is performed, regardless of the first object detecting means also detecting the same object as the object detected by the second object detecting means, the objects may not be recognized as being the same object. In this regard, as a result of the above-described configuration, a combining area having a size suitable for an execution state of axis displacement learning of the first object detecting means can be set. As a result, determination regarding whether or not objects detected by the plurality of object detecting means are the same can be accurately performed. That is, as a result of the above-described configuration, object recognition can be accurately performed.

DESCRIPTION OF EMBODIMENTS

An embodiment implementing an object recognition apparatus of a moving body will hereinafter be described with reference to the drawings. An object recognition apparatus 10 according to the present embodiment is an on-board apparatus that is mounted to a vehicle serving as the moving body. The object recognition apparatus 10 uses an imaging apparatus 11 and a radar apparatus 12 that are mounted to the vehicle to recognize an object that is present within a detectable area including an area ahead of the vehicle (according to the present embodiment, a system including the object recognition apparatus 10, the imaging apparatus 11, and the radar apparatus 12 is referred to as an object recognition system). First, an overall configuration of the object recognition apparatus 10 according to the present embodiment will be described with reference to FIG. 1 and FIG. 2.

The imaging apparatus 11 is an on-board camera. The imaging apparatus 11 is configured by a charge-coupled device (CCD) camera, a complementary metal-oxide-semiconductor (CMOS) image sensor, a near-infrared camera, or the like. The imaging apparatus 11 captures an image of a peripheral environment including a travel road of an own vehicle 50. The imaging apparatus 11 generates image data expressing the captured image and successively outputs the generated image data to the object recognition apparatus 10. The imaging apparatus 11 according to the present embodiment is, for example, set near an upper end of a front windshield of the own vehicle 50. The imaging apparatus 11 captures an image of a detectable area 61 that spreads over a range of a predetermined angle θ1, ahead of the vehicle, with an imaging axis AX1 as a center (see FIG. 2). The imaging apparatus 11 may be a single-lens camera or a stereo camera.

The radar apparatus 12 is a detection apparatus that detects an object by transmitting electromagnetic waves as transmission waves and receiving reflected waves thereof. For example, the radar apparatus 12 is configured by a millimeter wave radar or a laser radar. The radar apparatus 12 is attached to a front portion of the own vehicle 50. Using radar signals, the radar apparatus 12 scans a detectable area 62 that spreads over a range of a predetermined angle θ2 (θ2<θ1), ahead of the vehicle, with an optical axis AX2 as a center. The radar apparatus 12 generates distance measurement data based on an amount of time from when the electromagnetic waves are transmitted ahead of the vehicle until the reflected waves are received. The radar apparatus 12 successively outputs the generated distance measurement data to the object recognition apparatus 10. The distance measurement data includes information related to a direction in which an object is present, distance to the object, and relative speed.

According to the present embodiment, the imaging apparatus 11 and the radar apparatus 12 are attached to the own vehicle 50 such that the imaging axis AX1 that is a reference axis of the imaging apparatus 11 and the optical axis AX2 that is a reference axis of the radar apparatus 12 are in the same direction as a direction parallel to a travel road surface of the own vehicle 50. In addition, the detectable area 61 of the imaging apparatus 11 and the detectable area 62 of the radar apparatus 12 overlap each other at least in a part of the areas. The imaging apparatus 11 corresponds to a first object detecting means. The radar apparatus 12 corresponds to a second object detecting means or a detection apparatus.

Figure 1:
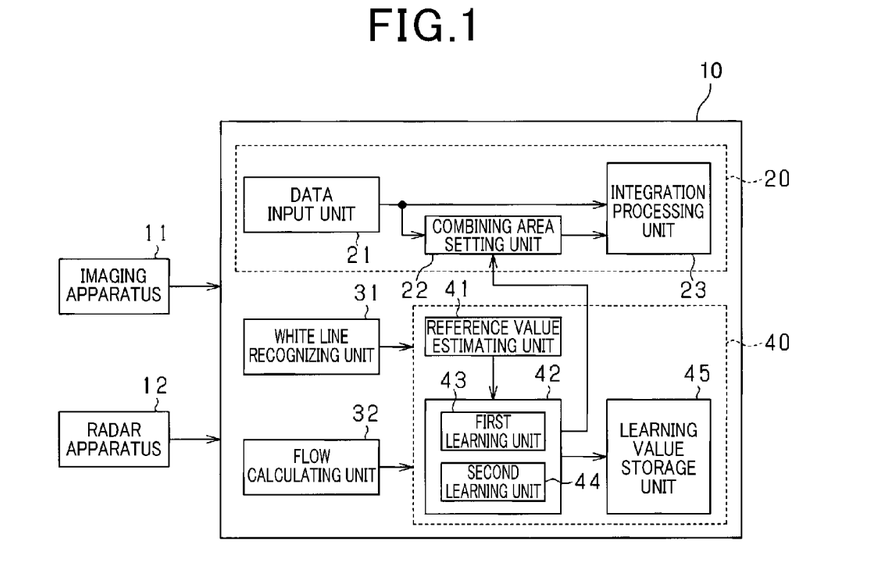
FIG. 1 is a block diagram of an overall configuration of an object recognition apparatus according to an embodiment.
Figure 2:
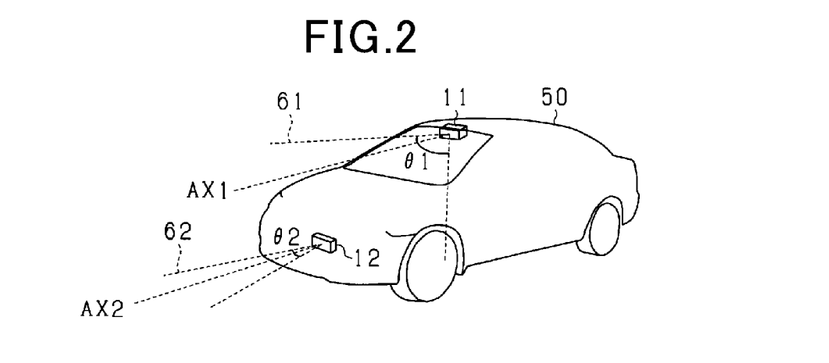
FIG. 2 is a diagram of placement of an imaging apparatus and a radar apparatus shown in FIG. 1.

The object recognition apparatus 10 is a computer that includes a central processing unit (CPU), a random access memory (RAM), a read-only memory (ROM), an input/output (I/O), and the like. The object recognition apparatus 10 includes a target detecting unit 20, a white line recognizing unit (lane marking recognizing means), a flow calculating unit 32 (flow calculating means), and a vanishing point calculating means 40 (axis displacement learning means). The CPU actualizes these functions by running a program installed in the ROM.

Based on information (image data and distance measurement data) related to an object acquired by the imaging apparatus 11 and the radar apparatus 12, the target detecting unit 20 detects a target included in the data. The target detecting unit 20 according to the present embodiment includes a data input unit 21, a combining area setting unit 22 (combining area setting means), and an integration processing unit 23 (integration processing means).

The data input unit 21 receives the image data from the imaging apparatus 11 and the distance measurement data from the radar apparatus 12. The combining area setting unit 22 inputs the image data and the distance measurement data from the data input unit 21, and sets a combining area (search area) that is an area for combining and integrating pieces of data belonging to a same object, based on the inputted data. The combining area is set for each of the imaging apparatus 11 and the radar apparatus 12.

Figure 3:
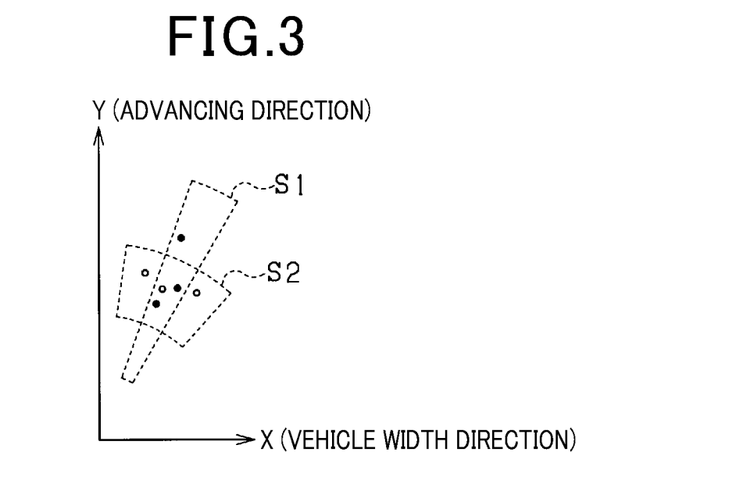
FIG. 3 is a diagram of an example of combining areas by a combining area setting unit shown in FIG. 1.

FIG. 3 shows an example of a combining area S1 of the imaging apparatus 11 and a combining area S2 of the radar apparatus 12. In FIG. 3, an X axis indicates a vehicle width direction and a Y axis indicates a vehicle advancing direction. In addition, a black circle indicates a detection point of the imaging apparatus 11. A white circle indicates a detection point of the radar apparatus 12. In the imaging apparatus 11, detection deviation tends to occur in a direction of the imaging axis AX1 (distance direction). Taking this tendency into consideration, an area that is long in the distance direction and narrow in an angular direction is basically set as the combining area S1 of the imaging apparatus 11. For example, with a single detection point detected by the imaging apparatus 11 as a reference, the combining area S1 is set to an area that is ±α1% (such as about 30%) of a distance to the reference in the distance direction and ±β1° (such as about 1°) in relation to the reference in the angular direction.

Meanwhile, in the radar apparatus 12, detection deviation tends to occur in a direction perpendicular to the optical axis AX2 (angular direction). Taking this tendency into consideration, an area that is short in the distance direction and wide in the angular direction is basically set as the combining area S2 of the radar apparatus 12. For example, with a single detection point detected by the radar apparatus 12 as a reference, the combining area S2 is set to an area that is ±α2% (such as about 20%) of a distance to the reference regarding the distance direction and ±β° (such as about 2°) in relation to the reference regarding the angular direction. A setting method for the combining area is not limited to that described above. For example, a method in which the combining area is set using a numerical expression prescribed in advance is also possible. The combining area S1 of the imaging apparatus 11 corresponds to a first combining area. The combining area S2 of the radar apparatus 12 corresponds to a second combining area.

The integration processing unit 23 performs a process for combining and integrating a plurality of pieces of image data present within the combining area S1 of the imaging apparatus 11 as data belonging to the same object, and a process for combining and integrating a plurality of pieces of distance measurement data present within the combining area S2 of the radar apparatus 12 as data belonging to the same object. In addition, when a positional relationship between the combining area S1 of the imaging apparatus 11 and the combining area S2 of the radar apparatus 12 meet a predetermining combinable condition prescribed in advance, the integration processing unit 23 integrates the pieces of data of a plurality of detection points present within the combining areas S1 and S2 as data belonging to the same object. Target data is generated by an integration process such as this. According to the present embodiment, the combinable condition includes overlapping of at least a part of the combining area S1 of the imaging apparatus 11 and the combining area S2 of the radar apparatus 12. Therefore, for example, in FIG. 3, the target data is generated based on the plurality of detection points of the imaging apparatus 11 indicated by the black circles and the plurality of detection points of the radar apparatus 12 indicated by the white circles. The combinable condition is not limited thereto. For example, the combinable condition may be that a separation distance between the combining areas S1 and S2 is a predetermined value or less.

The white line recognizing unit 31 inputs an image captured by the imaging apparatus 11 and recognizes a white line serving as a road marking that is included in the image. For example, the white line recognizing unit 31 extracts edge points serving as candidates for the white line from the captured image data, based on a luminance change rate in a horizontal direction of the image or the like, and successively stores the extracted edge points for each frame. Then, the white line recognizing unit 31 recognizes the white line based on a history of the stored edge points of the white line. The flow calculating unit 32 inputs an image captured by the imaging apparatus 11 and calculates optical flow as a movement vector of each point in the image, using the inputted image data. For example, the flow calculating unit 32 calculates the movement vector for each pixel based on a change in spatial luminance distribution.

The vanishing point calculating unit 40 includes a reference value estimating unit 41, a vanishing point learning unit 42, and a learning value storage unit 45. The reference value estimating unit 41 inputs information (white line information) related to a position of a white line and the like from the white line recognizing unit 31 and inputs information (flow information) related to optical flow from the flow calculating unit 32. The vanishing point calculating unit 40 then performs various processes for determining a vanishing point (focus of expansion [FOE]) using the inputted data.

The reference value estimating unit 41 calculates the vanishing point based on image data captured by the imaging apparatus 11. Specifically, the reference value estimating unit 41 calculates the vanishing point using the white line information inputted from the white line recognizing unit 31 or the flow information inputted from the flow calculating unit 32. For example, when the white line information is used, an intersection point between a pair of white lines present in the vehicle periphery is presumed to be the vanishing point, and the value thereof (reference vanishing point) is stored in the ROM. At the time of vehicle shipping, an initial value is stored in the ROM in advance as the vanishing point. For example, the initial value is set in advance based on a parameter indicating an attachment state of the imaging apparatus 11 (such as an attachment height or a depression angle of the imaging axis), or a parameters related to an imaging function of the imaging apparatus (such as number of pixels or focal point distance).

The vanishing point learning unit 42 performs vanishing point learning for calculating a constant displacement amount (axis displacement amount of the imaging axis AX1) of the vanishing point accompanying changes in the attachment height and axial direction of the imaging apparatus 11. Specifically, the vanishing point learning unit 42 includes a first learning unit 43 (first learning means) that performs learning regarding the vanishing point calculated from the white line information and a second learning unit 44 (second learning means) that performs learning regarding the vanishing point calculated from the flow information. The respective learning values (vanishing point learning values) of the first learning unit 43 and the second learning unit 44 are stored and updated in the learning value storage unit 45 each time learning is performed.

The vanishing point learning unit 42 starts vanishing point learning in accompaniment with a startup switch (such as an ignition switch) of the own vehicle 50 being turned ON. In addition, according to the present embodiment, vanishing point learning is successively performed even after vanishing point learning is completed the first time after the startup switch is turned ON, taking into consideration that the attachment height and the axial direction of the imaging apparatus 11 change depending on a loading state and a running state of the vehicle and, in accompaniment, the position of the vanishing point also changes.

For example, the learning value storage unit 45 is configured by a non-volatile memory (such as an electrically erasable programmable read-only memory [EEPROM]) in which data can be electrically rewritten. For example, the object recognition apparatus 10 estimates a running state in relation to a travel road of the own vehicle 50, a positional relationship between the own vehicle 50 and a leading vehicle, and the like, as well as recognizing pedestrians, by analyzing the image data with the vanishing point as an indicator.

However, white line recognition based on an image requires more time than the calculation of optical flow. Therefore, after the startup switch of the own vehicle 50 is turned ON, the time at which vanishing point learning based on optical flow is completed is earlier than the time at which vanishing point learning based on white line recognition is completed. Meanwhile, learning accuracy of vanishing point learning is higher when white line recognition is used, than when the optical flow is used. Therefore, according to the present embodiment, after the startup switch of the own vehicle 50 is turned ON, an image data analyzing process using the learning value calculated based on optical flow is performed until vanishing point learning based on white line recognition is completed. An image data analyzing process using the learning value calculated based on white line recognition is performed after vanishing point learning based on white line recognition is completed.

Figure 4:
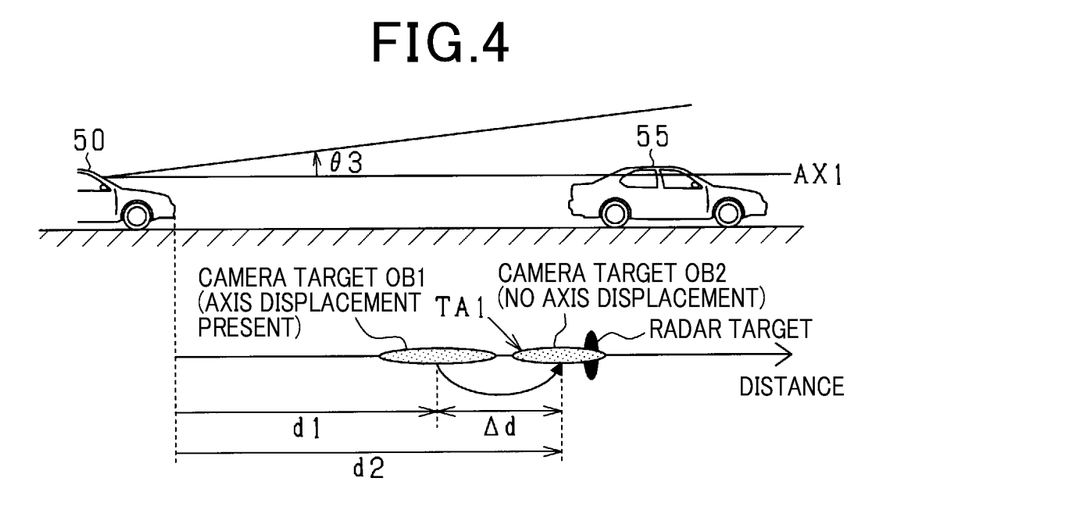
FIG. 4 is a schematic diagram of a deviation in detection distance when axis displacement of the imaging apparatus shown in FIG. 1 occurs.

Here, when axial displacement occurs in the imaging axis AX1, the distance to an object based on image recognition is erroneous by an amount equivalent to the axis displacement angle. FIG. 4 schematically shows a distance deviation of a camera target attributed to axis displacement of the imaging axis AX1. In FIG. 4, an instance in which axis displacement of the optical axis AX2 has not occurred is presumed.

When the imaging axis AX1 is displaced from a position parallel to the travel road surface by a predetermined angle θ3 in the upward direction, a detected distance d1 from the own vehicle 50 to the same object (leading vehicle 55 in FIG. 4) is shorter than a detected distance d2 when the axis displacement has not occurred in the imaging axis AX1 (d1<d2). At this time, when overlapping does not occur between the camera target and the radar target, that is, when the respective combining areas S1 and S2 do not overlap, regardless of the imaging apparatus 11 and the radar apparatus 12 detecting the same object, the two targets (camera target and radar target) are not recognized as belonging to the same object during data processing. Such erroneous detection can be considered to be resolved by the combining areas S1 and S2 of data being set to be wide at all times. However, it is considered that when the combining areas are wide at all times, regardless of a plurality of differing objects being present in actuality, the objects tend to be recognized as being the same object, and accuracy of driving assistance control decreases.

A deviation amount Δd of the detected distance attributed to axis displacement of the imaging apparatus 11 such as that described above is eventually resolved by vanishing point learning. For example, in FIG. 4, when an instance in which axis displacement occurs in the imaging apparatus 11 is considered, whereas the position of the camera target is within an area of OB1 that is away from the radar target before vanishing point learning is performed, the position of the camera target is detected as being within an area of OB2 that is closer to the radar target than within the area of OB1 as a result of vanishing point learning being performed.

Here, at the start of operation of the vehicle, a learning state of the vanishing point transitions from a learning incomplete state regarding both optical flow and white line recognition to a learning completed state regarding optical flow. Subsequently, the learning state changes to a learning completed state regarding white line recognition. In addition, in accompaniment with the changes in the learning state such as this, a change in the learning accuracy of the vanishing point, that is, a deviation amount in relation to a true value of the vanishing point, can be considered. For example, the accuracy (reliability) of the learning result differs between the state in which vanishing point learning based on white line recognition is not completed, and the state in which vanishing point learning based on white line recognition is completed. The learning accuracy in the learning incomplete state tends to be lower than that in the state after learning completion. In addition, when the accuracy of the vanishing point learning value is low, detection error in the distance to the object tends to occur as a result of axis displacement of the imaging apparatus 11.

Therefore, according to the present embodiment, the sizes of the combining area S1 of the imaging apparatus 11 and the combining area S2 of the radar apparatus 12 are variably set depending on an execution state of vanishing point learning. Specifically, the combining area setting unit 22 inputs, from the vanishing point learning unit 42, information regarding whether the current learning state is a vanishing point learning incomplete state, a state in which vanishing point learning based on optical flow is completed, or a state in which vanishing point learning based on white line recognition is completed.

The combining area setting unit 22 reduces the combining areas S1 and S2 based on the information related to the learning state inputted from the vanishing point learning unit 42. For example, when information indicating that vanishing point learning based on optical flow is completed is inputted, the combining areas S1 and S2 are both reduced in relation to that before completion of vanishing point learning based on optical flow. Next, when information indicating that vanishing point learning based on white line recognition is completed is inputted, the combining areas S1 and S2 are both further reduced in relation to that before completion of vanishing point learning based on white lien recognition.

Figure 5:
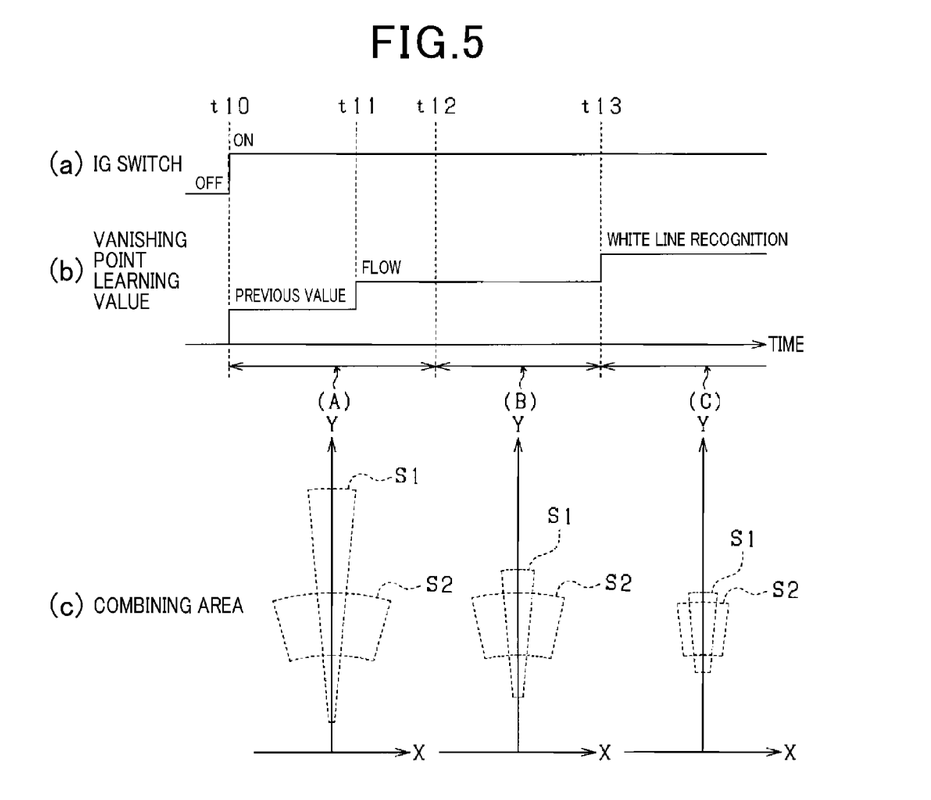
FIG. 5 is a time chart of a specific aspect of an axis displacement learning process by a vanishing point learning unit shown in FIG. 1 and a combining area setting process by the combining area setting unit shown in FIG. 1.

Next, a specific aspect of the combining area setting process based on the learning state of the vanishing point will be described with reference to the time chart in FIG. 5. In FIG. 5, (a) shows a transition of ON/OFF of the ignition switch (IG switch), (b) shows a transition of the vanishing point learning value, and (c) shows a transition of the combining areas S1 and S2. In FIG. 5, an instance is assumed in which the vehicle advancing direction (Y-axis direction) and the axial direction of the optical axis AX2 are the same, and a leading vehicle is present in the vehicle advancing direction at the time of the IG switch ON.

Immediately after the IG switch is turned ON, vanishing point learning based on optical flow and vanishing point learning based on white line recognition are not yet completed. The learning value stored upon a previous completion of vehicle running is stored as is in the learning value storage unit 45. Therefore, during the period from t10 to t11 until vanishing point learning based on optical flow is started, image processing is performed using a previous learning value FOE_A. During this period t10 to t11, as shown in FIG. 5(A), the widest areas (maximum combining areas) are respectively set for the combining areas S1 and S2.

At time t11 when a predetermined amount of time T1 has elapsed from the IG switch being turned ON, a command for starting vanishing point learning based on optical flow is outputted. The predetermined amount of time T1 is set to an amount of time (such as a few tens seconds) required for acquiring image data required for calculation of the optical flow. Then, when the vanishing point (FOE_C) calculated based on optical flow stabilizes and a determination is made that vanishing point learning based on optical flow is completed (time t12), as shown in FIG. 5(B), medium combining areas that are the maximum combining areas that have been reduced are set as the combining areas S1 and S2. Specifically, in the combining area S1 of the imaging apparatus 11, the angular direction remains as is and the distance direction is reduced in relation to the maximum combining area. In addition, in the combining area S2 of the radar apparatus 12, the distance direction remains as is and the angular direction is reduced in relation to the maximum combining area.

When a predetermined amount of time T2 (such as several minutes) further elapses from the command to start vanishing point learning based on optical flow and vanishing point learning based on white line recognition is completed (time t3), the combining areas S1 and S2 are further reduced. As shown in FIG. 5(C), minimum combining areas that are the medium combining areas that have been further reduced are set. Specifically, in the combining area S1 of the imaging apparatus 11, the angular direction remains as is and the distance direction is reduced in relation to the medium combining area. In the combining area S2 of the radar apparatus 12, the distance direction remains as is and the angular direction is reduced in relation to the medium combining area.

Next, processing steps in the combining area setting process performed by the combining area setting unit 22 will be described with reference to the flowchart in FIG. 6. These processes are performed at a predetermined cycle by the CPU of the object recognition apparatus 10.

Figure 6:
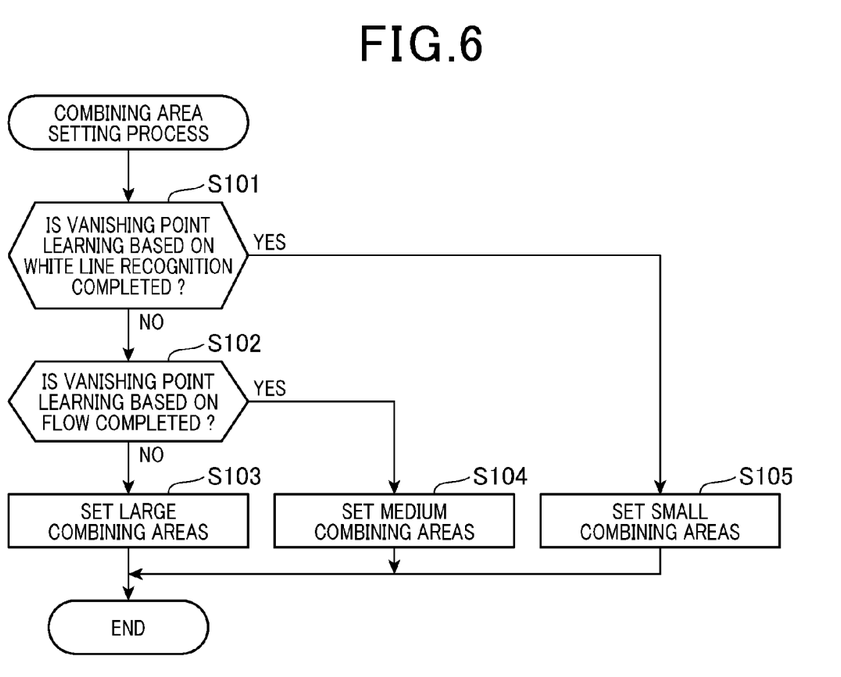
FIG. 6 is a flowchart of processing steps in the combining area setting process by the combining area setting unit shown in FIG. 1.

In FIG. 6, at step S101, the CPU determines whether or not vanishing point learning based on white line recognition is completed. When determined that vanishing point learning based on white line recognition is not yet completed, the CPU proceeds to step S102. The CPU determines whether or not vanishing point learning based on optical flow is completed. Here, the CPU determines whether or not the vanishing point calculated based on optical flow indicates a stable value. When determined that the vanishing point calculated based on optical flow is stable, the CPU calculates the vanishing point learning value (FOE_C) based on optical flow. Whether or not the vanishing point calculated based on optical flow indicates a stable value is determined based on dispersion of the vanishing point within a vertical plane. When the dispersion is less than a predetermined value, an affirmative determination is made.

When determined that the vanishing point calculated based on optical flow is not yet stable, the CPU makes a negative determination at step S102 and proceeds to step S103. At step S103, the CPU sets the maximum combining areas that are the widest among the maximum combining areas, medium combining areas, and minimum combining areas, as the combining area S1 of the imaging apparatus 11 and the combining area S2 of the radar apparatus 12.

When determined that the vanishing point calculated based on optical flow is stable and the vanishing point learning value (FOE_C) is calculated based on optical flow, the CPU proceeds to step S104. The CPU sets the medium combining areas that are the maximum combining areas that have been reduced as the combining areas S1 and S2. In addition, when determined that vanishing point learning based on white line recognition is completed, the CPU makes an affirmative determination at step S101 and proceeds to step S105. The CPU sets the minimum combining areas that are the smallest among the maximum combining areas, the medium combining areas, and the minimum combining areas, as the combining areas S1 and S2.

According to the present embodiment described in detail above, the following advantageous effects are achieved.

The configuration is such that the sizes of the combining area S1 of the imaging apparatus 11 and the combining area S2 of the radar apparatus 12 are variably set based on the execution state of axis displacement learning (vanishing point learning) of the imaging apparatus 11. As a result of such a configuration, combining areas having sizes suitable for execution of vanishing point learning can be set. Consequently, determination of whether or not objects detected by a plurality of object detecting means are the same can be accurately performed. As a result, object recognition can be accurately performed.

The configuration is such that the combining areas S1 and S2 are variably set depending on the accuracy of vanishing point learning. More specifically, the configuration is such that the combining areas S1 and S2 are reduced as the accuracy of vanishing point learning increases. The vanishing point learning value becomes closer to a true value as learning accuracy increases in accompaniment with the progression of vanishing point learning. The deviation amount of distance data detected by the imaging apparatus 11 from an actual value becomes small. In addition, if the combining areas S1 and S2 were to become larger, a plurality of objects that actually differ would be more likely to be erroneously recognized as being the same object. As a result of the above-described configuration being achieved in light of such issues, target detection by the plurality of object detecting means can be accurately performed.

In vanishing point learning based on white line recognition, the reliability of the learning result is high. However, a certain amount of time (such as several minutes to a few tens of minutes) is required until learning is completed. Therefore, during the period until vanishing point learning based on white line recognition is completed, image processing is required to be performed using the learning value acquired during the previous vehicle operation, or a learning value acquired by another learning means of which the learning accuracy is lower than that of vanishing point learning based on white line recognition, such as the vanishing point learning value based on optical flow.

In light of this issue, according to the present embodiment, the configuration is such that, after the start of operation of the vehicle, the combining areas S1 and S2 are reduced in accompaniment with the completion of the axis displacement learning based on white line information. As a result of such a configuration, before completion of vanishing point learning based on white line recognition, erroneous recognition of the same object detected by a plurality of object detecting means as differing objects can be prevented. After completion of learning, erroneous recognition of differing objects detected by a plurality of object detecting means as the same object can be prevented.

In vanishing point learning based on optical flow, learning can be completed at an earliest possible stage after the start of operation of the vehicle. However, learning accuracy is lower than that of vanishing point learning based on white line recognition and deviation in relation to the true value may occur.

In light of this issue, according to the present embodiment, the configuration is such that the combining areas S1 and S2 are reduced in accompaniment with the completion of vanishing point learning based on optical flow. In addition, the combining areas S1 and S2 are further reduced in accompaniment with the completion of vanishing point learning based on white line recognition. Even when vanishing point learning based on optical flow is completed, the accuracy of object recognition can be considered low because the learning accuracy of vanishing point learning is low, until the completion of vanishing point recognition based on white line recognition. However, as a result of such a configuration, the combining areas S1 and S2 are set in correspondence with the accuracy of the learning results. Therefore, determination accuracy regarding whether the objects detected by a plurality of object detecting means are the same object or differing objects can be made improved.

In the vehicle in which the imaging apparatus 11 and the radar apparatus 12 are mounted as the object detecting means, axis displacement determination regarding the radar apparatus 12 is performed based on the object detection results from the imaging apparatus 11 and the radar apparatus 12. In general, detection range and detection accuracy of an object differ between the imaging apparatus 11 and the radar apparatus 12. For example, detection error tends to occur in the imaging apparatus 11 in the distance direction and detection error tends to occur in the radar apparatus 12 in the angular direction. In this regard, as a result of the present invention being applied to the object recognition system of a vehicle in which both apparatuses are mounted, object recognition can be performed while offsetting respective weaknesses.

When the combining areas S1 and S2 are reduced based on the execution state of axis displacement learning (vanishing point learning) of the imaging apparatus 11, regarding the combining area S1 of the imaging apparatus 11, the angular direction remains as is and the distance direction is reduced. As a result, the reduction ratio in the distance direction is greater than the reduction ratio in the angular direction. Conversely, regarding the combining area S2 of the radar apparatus 12, the distance direction remains as is and the angular direction is reduced. As a result, the reduction ratio in the angular direction is greater than the reduction ratio in the distance direction. In this way, the reduction direction and the extent of reduction of the combining area are variably set depending on the object detecting means. As a result, appropriate combining areas can be set while reflecting the tendency for detection errors to occur in the object detecting means.

(Other Embodiments)

The present invention is not limited to the above-described embodiment and, for example, may be carried out in the following manner.

According to the above-described embodiment, the aspect of reducing the combining areas S1 and S2 based on the execution state of vanishing point learning may be other than that described above. For example, the configuration may be such that only the distance direction is reduced for both the combining areas S1 and S2. Alternatively, the configuration may be such that only the angular direction is reduced for both the combining areas S1 and S2. Alternatively, the configuration may be such that both the distance direction and the angular direction are reduced for both the combining areas S1 and S2.

As the aspect in which the reduction ratio in the distance direction is greater than the reduction ratio in the angular direction in the combining area S1 of the imaging apparatus 11, and the reduction ratio in the angular direction is greater than the reduction ratio in the distance direction in the combining area S2 of the radar apparatus 12, according to the present embodiment, the angular direction of the combining area S1 of the imaging apparatus 11 remains as is and the distance direction of the combining area S2 of the radar apparatus 12 remains as is. However, both the distance direction and the angular direction may be reduced.

Specifically, regarding the combining area S1 of the imaging apparatus 11, the reduction ratio in the distance direction is set to K1 (K<1) and the reduction ratio in the angular direction is set to K2 (K2<K1). The combining area S1 is set using the reduction ratios K1 and K2. In addition, regarding the combining area S2 of the radar apparatus 12, the reduction ratio in the angular direction is set to K3 (K3<1) and the reduction ratio in the distance direction is set to K4 (K4<K3). The combining area S2 is set using the reduction ratios K3 and K4.

According to the above-described embodiment, a case in which the combining areas S1 and S2 are variably set during the period from when the ignition switch is turned ON until vanishing point learning based on white line recognition is once completed is given as an example. However, the configuration may be such that the combining areas S1 and S2 are variably set during a period after vanishing point learning based on white line recognition is once completed. Vanishing point learning based on white line recognition is highly accurate. Once learning is completed, changes in the learning value thereafter are relatively small. However, for example, it is considered that in accompaniment with changes in the loading state and running state of the vehicle, the axial direction of the imaging axis AX1 changes, and the position of the vanishing point changes.

Therefore, the configuration may be such that the combining areas S1 and S2 are variably set based on the learning state of vanishing point learning when a change in the vanishing point learning value occurs during the period after vanishing point learning based on white line recognition is once completed. Specifically, an aspect in which the combining areas S1 and S2 are set to be relatively large until vanishing point learning based on white line recognition is completed, and the combining areas S1 and S2 are reduced in accompaniment with the completion of vanishing point learning based on white line recognition, or the like can be given.

According to the above-described embodiment, application to a configuration in which vanishing point learning based on optical flow and vanishing point learning based on white line recognition are performed as vanishing point learning is described. However, application to a configuration in which only either of vanishing point learning based on optical flow and vanishing point learning based on white line recognition is performed is also possible. For example, in a configuration in which vanishing point learning based on optical flow is not performed, in FIG. 5, the maximum combining areas are set as the combining areas S1 and S2 before time t13. The minimum combining areas are set as the combining areas S1 and S2 in accompaniment with the completion of vanishing point learning based on white line recognition at time t13.

According to the above-described embodiment, a case in which the first object detecting means is the imaging apparatus 11 and the second object detecting means is the radar apparatus 12 is described. However, the first object detecting means and the second object detecting means are not limited to those described above. For example, the present invention may be applied to a system in which the first object detecting means is the radar apparatus 12 and the second object detecting means is the imaging apparatus 11. In this case, the combining area S1 and S2 are variably set based on the axis displacement learning state of the radar apparatus 12.

A publicly known learning method can be used as the method for performing axis displacement learning of the radar apparatus 12. As examples thereof, a method in which the axis displacement of the radar apparatus 12 is learned through comparison of the frequency of target detection by the imaging apparatus 11 and the frequency of target detection by the radar apparatus 12, a method in which, based on a vanishing point detected based on an image captured during vehicle-running and a transmitting direction of a signal transmitted from the radar apparatus 12, an axis displacement amount of the radar apparatus 12 is learned through detection of error between the signal transmitting direction and the vehicle advancing direction, and the like can be used.

The combination of the first object detecting means and the second object detecting means is not limited to the combination of the imaging apparatus 11 and the radar apparatus 12. For example, the present invention may be applied to a system that includes a plurality of radar apparatuses (first radar apparatus and second radar apparatus) as the first object detecting means and the second object detecting means. Alternatively, the present invention may be applied to a system in which the first object detecting means and the second object detecting means are both imaging apparatuses.

In FIG. 4 according to the above-described embodiment, a case in which axis displacement occurs within a vertical plane in the imaging apparatus 11 is described as an example. However, the present invention is not limited to the axis displacement within the vertical plane and can also be applied to a case in which the axis displacement occurs within a horizontal plane.

The detectable areas of the first object detecting means and the second object detecting means are not limited to the area ahead of the vehicle and may be, for example, an area behind or to the side of the vehicle. In addition, the attachment positions of the first object detecting means and the second object detecting means are not particularly limited.

According to the above-described embodiment, the imaging apparatus and the radar apparatus are used as the plurality of object detecting means. However, the present invention is not limited thereto. For example, a sonar that detects an object using ultrasonic waves as transmission waves may also be used.

According to the above-described embodiment, the object recognition apparatus that is mounted to a vehicle is described as an example. However, for example, the object recognition apparatus can also be mounted to a moving body such as a railway car, a ship, or an aircraft.

REFERENCE SIGNS LIST

10: object recognition apparatus
11: imaging apparatus (first object detecting means)
12: radar apparatus (second object detecting means, detection apparatus)
20: target detecting unit
22: combining area setting unit (combining area setting means)
23: integration processing unit (integration processing means)
31: white line recognizing unit (lane marking recognizing means)
32: flow calculating unit (flow calculating means)
40: vanishing point calculating unit (axis displacement learning means
42: vanishing point learning means
43: first learning unit (first learning means)
44: second learning unit (second learning means)
45: learning value storage unit
50: own vehicle
AX1: imaging axis (reference axis)
AX2: optical axis (reference axis)
S1: combining area (first combining area)
S2: combining area (second combining area)

The invention claimed is:

1. An object recognition apparatus mounted to a moving body, the moving body being provided with a plurality of object detecting apparatuses for detecting an object present within a predetermined detectable area including a reference axis, the plurality of object detecting apparatus including a first object detecting apparatus and a second object detecting apparatus, the detectable area of the first object detecting apparatus and the detectable area of the second object detecting apparatus overlapping each other, the object recognition apparatus comprising:
a processor, wherein the processor is configured to:
learn an axis displacement amount of the reference axis of the first object detecting apparatus;
combine and integrate, as information belonging to a same object, a plurality of pieces of information present within a first combining area and a second combining area, when a positional relationship between the first combining area and the second combining area meets a predetermined combinable condition, the first combining area being set as an area in which pieces of information related to the object acquired by the first object detecting apparatus are combined, the second combining area being set as an area in which pieces of information related to the object acquired by the second object detecting means apparatus are combined; and
variably set sizes of the first combining area and the second combining area based on a learning state of the axis displacement amount learned by the processor.

2. The object recognition apparatus according to claim 1, wherein:
the processor reduces the first combining area and the second combining area as accuracy of learning by the processor increases.

3. The object recognition apparatus according to claim 2, wherein:
the first object detecting apparatus is an imaging apparatus that captures an image of a peripheral environment including a road;
the processor is further configured to recognize a lane marking on the road based on an image captured by the first object detecting apparatus;
the processor learns the axis displacement amount of the reference axis of the first object detecting apparatus based on lane marking information that is information related to the lane marking recognized by the processor; and
the processor reduces the first combining area and the second combining area from those before completion of learning when learning of the axis displacement amount based on the lane marking information by the processor is completed after start of operation of the moving body.

4. The object recognition apparatus according to claim 3, wherein:
the processor is further configured to calculate an optical flow based on an image captured by the first object detecting apparatus, wherein:
the processor performs a first learning process to learn the axis displacement amount of the reference axis of the first object detecting apparatus based on the optical flow calculated by the processor and performs a second learning process to learn the axis displacement amount of the reference axis of the first object detecting apparatus based on the lane marking information, and the first learning process is completed earlier than the second learning process after the start of operation of the moving body; and
the processor reduces the first combining area and the second combining area from those before completion of each learning when the first learning process is completed and the second learning process is completed after the start of operation of the moving body.

5. The object recognition apparatus according to claim 4, wherein:
the first object detecting apparatus is an imaging apparatus that captures an image of a peripheral environment including a road; and
the second object detecting apparatus is a detection apparatus that detects an object by transmitting transmission waves and receiving the transmitted transmission waves.

6. The object recognition apparatus according to claim 5, wherein:
the processor sets a reduction ratio in a distance direction to be greater than a reduction ratio in a width direction that is perpendicular to the distance direction, when the first combining area is reduced based on the learning state of the axis displacement amount by the processor.

7. The object recognition apparatus according to claim 6, wherein:
the processor sets the reduction ratio in the width direction that is perpendicular to the distance direction to be greater than the reduction ratio in the distance direction when the second combining area is reduced based on the learning state of the axis displacement amount by the processor.

8. The object recognition apparatus according to claim 7, wherein:
the moving body is a vehicle.

9. The object recognition apparatus according to claim 1, wherein:
the first object detecting apparatus is an imaging apparatus that captures an image of a peripheral environment including a road;
a the processor is further configured to recognize a lane marking on the road based on an image captured by the first object detecting apparatus is further included;
the processor learns the axis displacement amount of the reference axis of the first object detecting apparatus based on lane marking information that is information related to the lane marking recognized by the processor; and
the processor reduces the first combining area and the second combining area from those before completion of learning when learning of the axis displacement amount based on the lane marking information by the processor is completed after start of operation of the moving body.

10. The object recognition apparatus according to claim 1, wherein:
the first object detecting apparatus is an imaging apparatus that captures an image of a peripheral environment including a road; and
the second object detecting apparatus is a detection apparatus that detects an object by transmitting transmission waves and receiving the transmitted transmission waves.

11. The object recognition apparatus according to claim 1, wherein:
the processor sets the reduction ratio in the width direction that is perpendicular to the distance direction to be greater than the reduction ratio in the distance direction when the second combining area is reduced based on the learning state of the axis displacement amount by the processor.

12. The object recognition apparatus according to claim 1, wherein:
the moving body is a vehicle.

13. An object recognition system comprising:
a plurality of object detecting apparatus for detecting an object present in a predetermined detectable area including a reference axis that are mounted to a moving body; and
an object recognition apparatus that is mounted to the moving body,
the plurality of object detecting apparatuses including a first object detecting apparatus and a second object detecting means apparatus, the detectable area of the first object detecting apparatus and the detectable area of the second object detecting apparatus overlapping each other, and
the object recognition apparatus including:
a processor, wherein the processor is configured to:
learn an axis displacement amount of the reference axis of the first object detecting apparatus;
combine and integrate, as information belonging to a same object, a plurality of pieces of information present within a first combining area and a second combining area, when a positional relationship between the first combining area and the second combining area meets a predetermined combinable condition, the first combining area being set as an area in which pieces of information related to the object acquired by the first object detecting apparatus are combined, the second combining area being set as an area in which pieces of information related to the object acquired by the second object detecting apparatus are combined; and
variably set sizes of the first combining area and the second combining area based on a learning state of the axis displacement amount learned by the processor.

14. A processing method of an object recognition apparatus that is a processing method of an object recognition apparatus mounted to a moving body, the moving body being provided with a plurality of object detecting apparatus for detecting an object present within a predetermined detectable area including a reference axis, the plurality of object detecting apparatuses including a first object detecting apparatus and a second object detecting apparatus, and the detectable area of the first object detecting apparatus and the detectable area of the second object detecting apparatus overlapping each other; and
the processing method of the object recognition apparatus comprising:
learning, by a processor provided in the object recognition apparatus, an axis displacement amount of the reference axis of the first object detecting apparatus,
combining and integrating, by the processor, as information belonging to a same object, a plurality of pieces of information present within a first combining area and a second combining area, when a positional relationship between the first combining area and the second combining area meets a predetermined combinable condition, the first combining area being set as an area in which pieces of information related to the object acquired by the first object detecting apparatus are combined, the second combining area being set as an area in which pieces of information related to the object acquired by the second object detecting apparatus are combined; and
variably setting, by the processor, sizes of the first combining area and the second combining area based on a learning state of the axis displacement amount learned by the processor.

* * * * *